United States Patent [19]

Skinner et al.

[11] 4,299,676
[45] Nov. 10, 1981

[54] RECOVERY OF SILVER FROM PHOTOGRAPHIC FILM

[75] Inventors: John H. Skinner, Royston Herts; James S. Bentley, Tewin, both of England

[73] Assignee: Photographic Silver Recovery Limited, Waltham Cross, England

[21] Appl. No.: 134,503

[22] Filed: Mar. 27, 1980

[30] Foreign Application Priority Data

Jan. 31, 1980 [GB] United Kingdom ................ 3307/80

[51] Int. Cl.³ .......................... C25B 15/08; C25C 1/20
[52] U.S. Cl. .................................... 204/109; 204/275; 204/237
[58] Field of Search .................... 204/109, 275, 237

[56] References Cited

U.S. PATENT DOCUMENTS 3,510,413 5/1970 Lindau .............................. 204/109

FOREIGN PATENT DOCUMENTS

2646378 4/1977 Fed. Rep. of Germany ...... 204/109

*Primary Examiner*—Howard S. Williams

[57] ABSTRACT

A process is provided for recovering silver and plastics material from photographic film. For exposed film, film is shredded or chopped, subjected to bleach treatment, washed, and subjected to fixing treatment, the fixing solution being circulated in closed circuit through an electrolytic silver recovery plant in which silver is deposited on one or more cathodes. For unexposed film, the bleach and washing steps can be omitted. For high silver recovery, the main fixing treatment is followed by a tailings treatment in fix solution, the tailings solution being circulated through a separate silver recovery unit of lower capacity and lower power. To maintain the fixing solution pH, a first wash in plain water is followed, before fixing, by a second wash in water treated with an alkaline chemical to raise its pH. Apparatus for performing the process may include bleach, wash and fixing towers through which material falls from chamber to chamber under control of sliding plate valves; or, a carousel can rotate baskets of film material stepwise from station to station, the carousel being carried by a ram for lowering and raising the baskets so that they can be immersed in treatment tanks at the stations and then drain; or a raised treatment vessel can be connected to solution tanks at a lower level by a pipe manifold, with pumps and valves arranged so that the solutions can be successively pumped up into the treatment vessel and allowed to drain back into respective tanks.

16 Claims, 6 Drawing Figures

RECOVERY OF SILVER FROM PHOTOGRAPHIC FILM

This invention relates to the recovery of silver from photographic film, both exposed film and scrap unexposed film.

A usual way of recovering silver from scrap film is to burn the film. However, this means that the plastics base material of the film is entirely lost and also the silver in the ash after burning is a fine dust that needs to be collected by means of a comparatively expensive electrostatic precipitator. It is therefore an object of the invention to provide a more attractive recovery process.

According to the present invention, in a process for the recovery of silver from photographic film, the film is first shredded or chopped into strips or pieces of predetermined size, the shredded or chopped film material is subjected to bleaching in a bleach bath, if the film is exposed film, to convert the metallic silver present to soluble silver salts that remain on the material, and then the material is treated in at least one fixing bath to remove the silver salts into the fixing solution, the film base material being afterwards collected and transported away, and the fixing solution being circulated through at least one electrolytic silver recovery unit where the silver is deposited electrolytically on a cathode.

Both bleach and 'fix' solutions can be regenerated and re-circulated. The plastics film base material can be recovered and put to commercial use.

It should be noted that this chemical process leaves the gelatine emulsion on the film unaffected and should the plastics base material of the film be required free of gelatine a further stage of enzyme processing or other appropriate technique may be employed.

The bleach solution used in the first stage of the treatment may have the following composition:

| Copper sulphate crystals | 135 g. |
|---|---|
| Hydrochloric acid 37% | 25 ml. |
| Sodium chloride | 80 g. |
| Water to | 1 liter |

This converts the image silver into silver chloride which remains on the film.

The following washing step is carried out with the minimum volume of water and the bleach in this wash water is recovered if possible.

The fixing solution may be composed as follows.

| Ammonium thiosulphate | 140 g. |
|---|---|
| Sodium metabisulphate | 25 g. |
| Sodium sulphite | 25 g. |
| Water to | 1 liter |

This converts the silver chloride into soluble silver thiosulphate complexes. The film is left in the fix solution for at least twice the time required to form the complexes (i.e. to clear) in order to allow complete diffusion of the silver complexes from the film into the fix solution.

The fix solution is withdrawn and passed into an electrolytic silver recovery machine where the silver is continuously removed, the desilvered fixer being recycled for re-use. As only silver chloride is being fixed, the fixer should be capable of indefinite recycling.

It is possible to use relatively crude chemicals rather than refined photographic chemicals thus reducing the cost of operation and improving the economics of the process.

Preferably, the film is treated twice with fixer, first in a main chamber and then in a tailings chamber, the main and tailings solutions being passed to respective separate silver recovery installations of which that for the tailings solution is of lower silver capacity and lower power.

To treat scrap unexposed film, for which no bleaching step is required, a process can be employed as follows.

The film is first cut into 0.1" wide strips, with a serrated edge, and into lengths not exceeding 18", to prevent the film sticking together. The raw material and end product film material are physically similar and can be handled by equipment such as standard belt conveyor systems. The film slittings can be fed directly on to a belt conveyor which continuously transports the material to a bulk storage hopper.

Film is fed by batch weight quantity from the hopper into a chamber which contains fixer solution. This solution removes almost all the silver from the film, and the solution is circulated through a silver recovery plant where it is subjected to electrolysis to extract the silver and then returned to a storage tank. After a short period for drainage the film batch is transferred to a second chamber and the process repeated. This second chamber is the tailings chamber, to reduce the carry-over losses of silver to a minimum.

The solution from the tailings chamber is circulated through a separate circuit containing a lower powered silver recovery plant, so that the solution can be maintained at silver levels not exceeding 0.1 grammes per liter.

The film batch leaves the second chamber and is deposited on to a perforated screen, under which is fitted a drip tank. The film is then carried by belt conveyor to a suitable bailing unit.

In the respective separate electrolysis circuits for recovering the silver from the solutions from the two fixing chambers, the circuit used with the tailings chamber solution is of smaller silver capacity and lower power than the circuit used with the solution from the first chamber. The circuit of the first chamber comprises four 600 amp. electrolytic cylindrical cathode silver recovery machines with appropriate circuit pumps, tanks, etc. The circuit of the second chamber comprises one 60 amp. silver recovery machine with appropriate pump, tanks, etc. The silver recovery machines may operate according to the principle protected in U.S. Pat. No. 3,715,291 to Bentley, so that the amperage setting of each machine is constant.

With batch loads of 30 kg. and a cycle time of 5 minutes the plant can process, during an 8-hour day, 3.6 tons of film strip, or 18 tons per week. Each 30 kg. load containing 0.750 kg. of silver is finally washed in the tailings solution containing, say, 0.1 grammes of silver per liter. Assuming 6 liters carry-over of solution with the film, silver loss to drain is 0.6 g. which represents 0.08% loss.

The processing machine and silver recovery plants are controlled automatically by clock and sequence timers. Likewise, an automatic system controls the slitters that produce the film feed to the fixing chambers.

Various forms of apparatus for performing processes according to the invention will now be described by way of example with reference to the accompanying drawings, in which.

Figure 1:
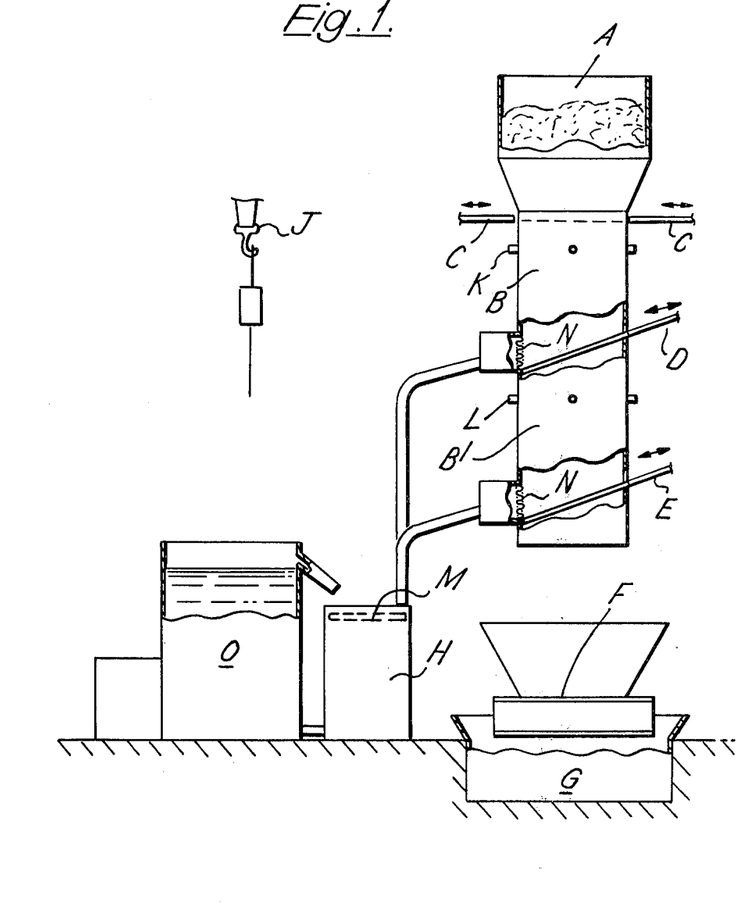
FIG. 1 illustrates diagrammatically apparatus for treating unexposed film in which the film being treated is fed through the chambers by gravity.

Referring firstly to FIG. 1, this illustrates the treatment of unexposed film. A hopper A at the top of the apparatus is filled by a hoist J. Each batch of film drops from the hopper A through a valve C, comprising air-operated slide plates, into the first fixing chamber B. The fixer solution is introduced into the chamber B via four spray jets K delivering 150 liters per minute. Operation of an air-operated slide plate valve D dumps the contents of chamber B into the tailings chamber B1, into which fixer solution is introduced by means of four spray jets delivering 150 liters per minute. From the tailings chamber B1 the treated film drops into a hopper over the perforated screen plate F when an air-operated slide plate valve E is opened. A drip tank G collects the drainings from the film on the screen plate F.

The floors of the chambers B and B1, constituted by the slide plates of valves D and E, respectively, slope down to respective mesh screens N through which the liquid contents of the chambers drain. The solution from chamber B is fed via a filler screen M and four interconnected balance tanks H to the four 600 amp. electrolytic silver recovery units O. The solution from the chamber B1 is fed via a filler screen and a single balance tank to the single 60 amp. silver recovery unit.

When the slide valve E dumps the film contents of the chamber B1 into the draining hopper F, it remains open for 3 seconds. On closing of valve E a signal causes slide valve D to open and film drops from chamber B into chamber B1.

On slide valve D closing a signal causes slide valve C to open to allow film to fill chamber B. Valve C closes 3 seconds later and a signal initiates the processing. The spray jets K and L are turned on for three minutes, simultaneously with the silver recovery units which then operate for a total plating time of 6 minutes.

At the end of 3 minutes, the perforated plate F is moved by the action of an air ram to transfer the bulk of the film resting on it to a belt conveyor for removal to outside hoppers. 5 seconds later the plate F returns to its initial position.

After 6 minutes the mechanical transfer process brought about by operation of the valves E, D, C is again initiated which takes an elapsed time of, say, 10 secs.

The main vertical trunk of the apparatus is made in stainless steel, square in section, say 3 ft. by 3 ft. The top slide valve C is comprised of two plates each operated by its own air ram which pinch the film across the centre when the chamber B is filled. This serves to trap a controlled mass of film on each operation.

The middle and lower valves D and E are single slides each approximately 3'×3' positioned at, say, 15° to the horizontal to direct flow to the side manifold outlets. The manifolds are 36" long and have an entry, say, 3" deep over which the perforated stainless steel screen N is fitted. Each manifold communicates with a duct leading to the tanks H.

The slides must be substantially watertight and may operate in neoprene channels mounted on stainless steel angle section members. Neoprene wiper strips may be provided on each end and sealing strips on the top sides. Suitable valves can be found in the range of sliding plate pinch valves manufactured by Mucon.Engineering Company Limited.

The four spray nozzles or jets can be fitted at each corner of the respective chamber and converge centrally. They should deliver at least 120 liters per minute. Jets may be located, say, two-thirds of the way up from the bottom of the respective chamber.

The perforated screens and manifolds should be detachable e.g. attached by studs welded to the trunking. The screens will be kept clean due to the wiping action of the film bulk sliding past the screen face on transfer.

It will be noted that leakage and drippings from the process are collected in the tank G. This solution is metered back to the supply tank for chamber B as this chamber receives dry film and the solution requires replenishment.

Figure 2:
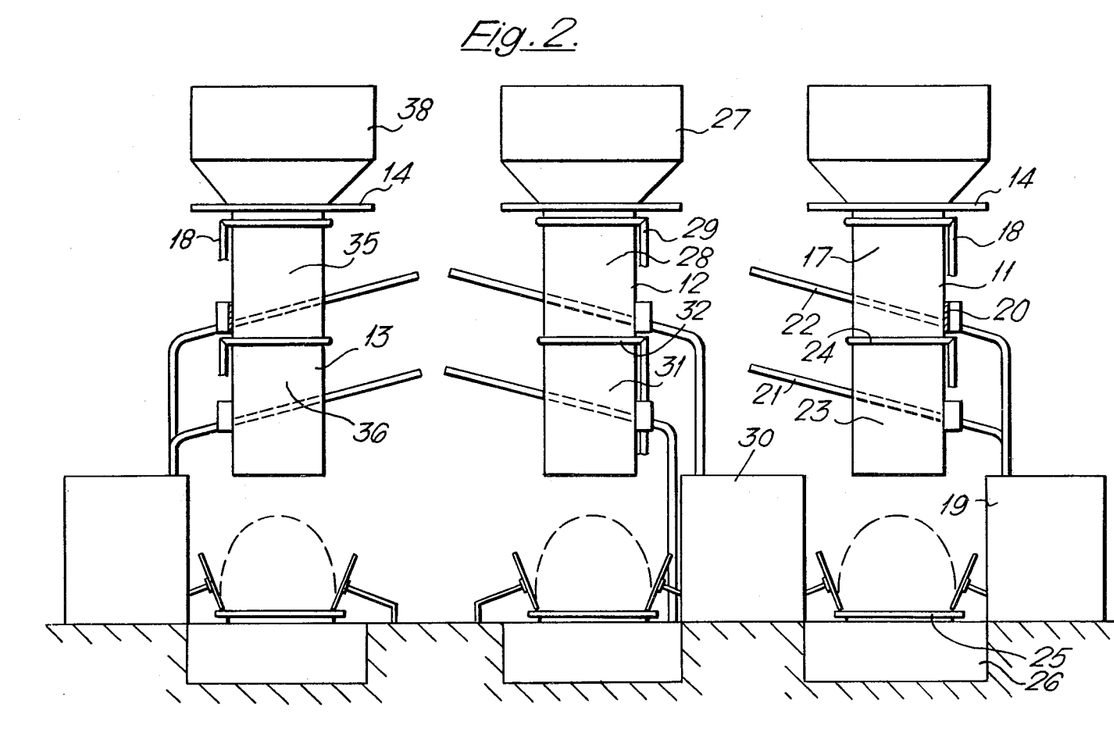
FIGS. 2 and 3 are, respectively, diagrammatic front and end elevations of one form of apparatus for treating exposed film.
Figure 3:
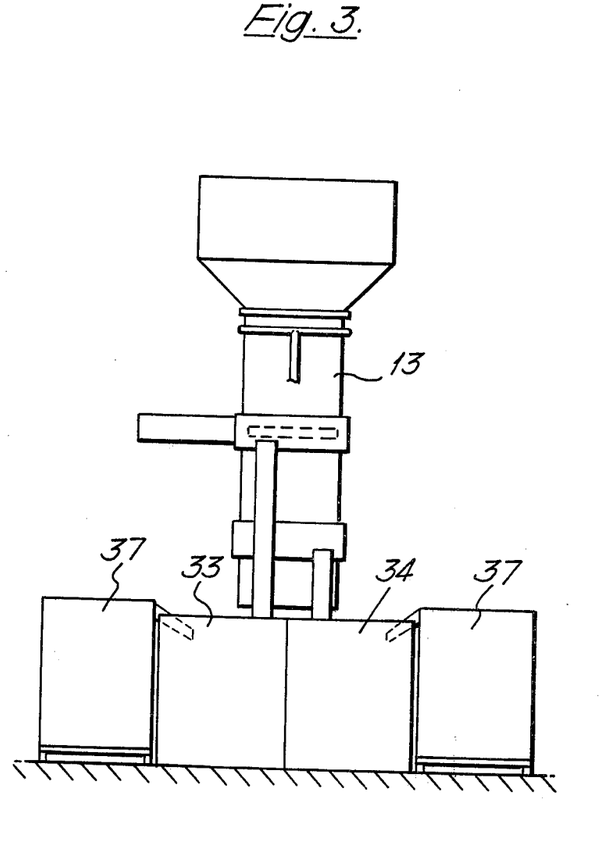

FIGS. 2 and 3 shows a plant for the treatment of exposed film, in which three suspended towers 11, 12, 13 are provided, the tower 11 being for a film bleach process, the tower 12 for film washing and the tower 13 for the film fixing process.

The film from the slitting machines is fed by a belt conveyor or suitable means to the hopper above the bleach tower 11 to maintain a continual stock for processing. The gate valves 14, 15 and 16 of the bleach tower are shut. The movement forward of the film through the process is as follows:

Gate valve 14 opens and closes within 2-3 seconds allowing chamber 17 in the bleach tower 11 to be filled with film. Spray-jets on a manifold 18 arranged near the top of the chamber spray jets of bleach solution at high pressure into the chamber 17 the solution being pumped from a bleach tank 19. After 3 minutes the chamber 17 is flooded with bleach solution—pumping is cut off and gate valve 20 is opened allowing the solution to drain back to the tank 19. After 3 minutes gate 20 closes and gate 21 opens and closes (3 seconds interval) followed by gate 22 and gate 14.

The lower chamber 23 now contains a partially treated bleached film which is then sprayed for a further 3 minutes via jet manifold 24 and remains draining back to the tank 19 for the subsequent 3 minutes of the 6 minute cycle. On the next 6 minute cycle the film load is dropped on to vibrating screen 25 where it remains draining into collection tank 26 for 5 minutes. A transfer ram pushes the film on to an elevator which conveys the bleached film to hopper 27 above the wash tower 12.

The wash tower 12 operates in conjunction with the bleach tower cycles and continues the film batch progress through the wash tower to the fixer tower 13 and the reclaiming of the polyester film base.

The first chamber 28 of the wash tower 12 is sprayed via sprays 29 with wash water from a tank 30 for 3 minutes and drained for 3 minutes. The lower chamber 31 is tap water sprayed for 3 minutes via sprays 32 and drained for 3 minutes. The film is then dumped, drained and transferred to the hopper of the fixer tower 13.

Combined with the fixer tower 13 are two tanks 33, 34 containing the fixer solution. The tank 33 feeds the upper chamber 35 of the tower and tank 34 the lower chamber 36.

The contents of the tank 33 are circulated by pumps to four 800 amp. silver recovery units 37. Two of these operate during the processing of exposed film and four machines are used for unexposed film.

The lower chamber 36 of the fixer tower 13 is connected to the separate tank 34 and this is interconnected to a single 100 amp. silver recovery unit 39. The object of this is to enable the film to be rinsed with low silver bearing fixer which can be maintained at around 0.1 grammes per liter, thus reducing the loss by carry-over of silver to around 0.6 grammes per load.

A simple method of switching the process from exposed to unexposed shredded film is to provide a gate on the feed conveyor to divert new film direct to hopper 38 above the fixer tower 13. By switching off the operations in the bleach and wash towers 11, 12 and switching on the additional two of the four silver recovery units 37 a change-over of the process can be effected.

Figure 4:
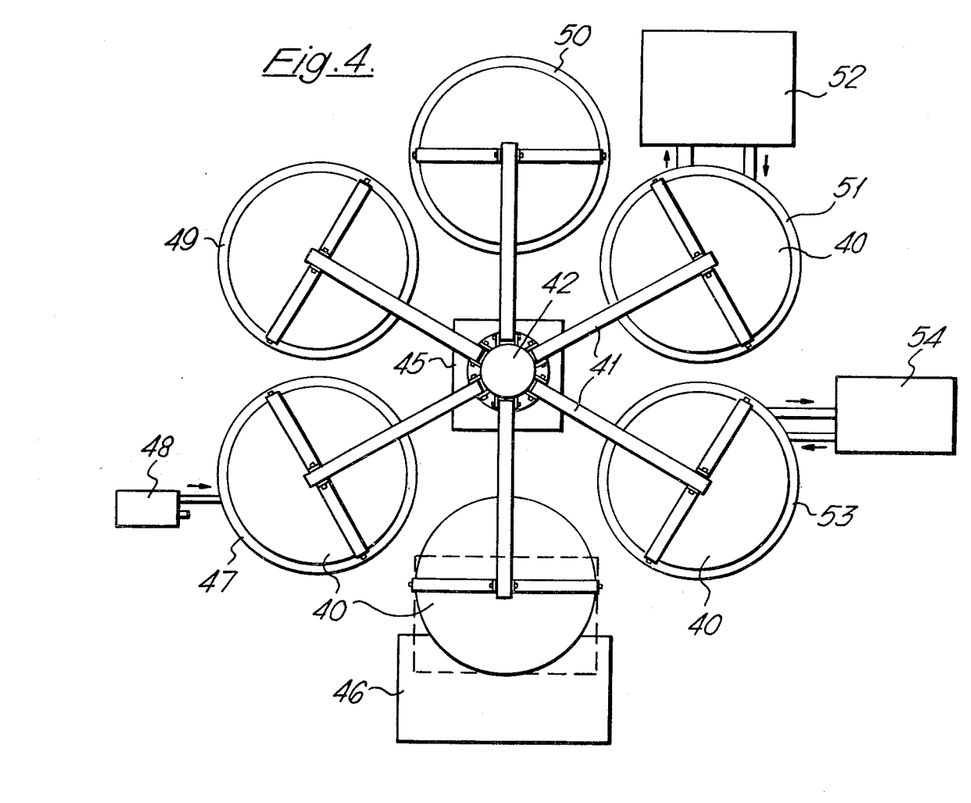
FIGS. 4 and 5 show, in plan and elevation respectively, an apparatus of carousel type for treating exposed film.
Figure 5:
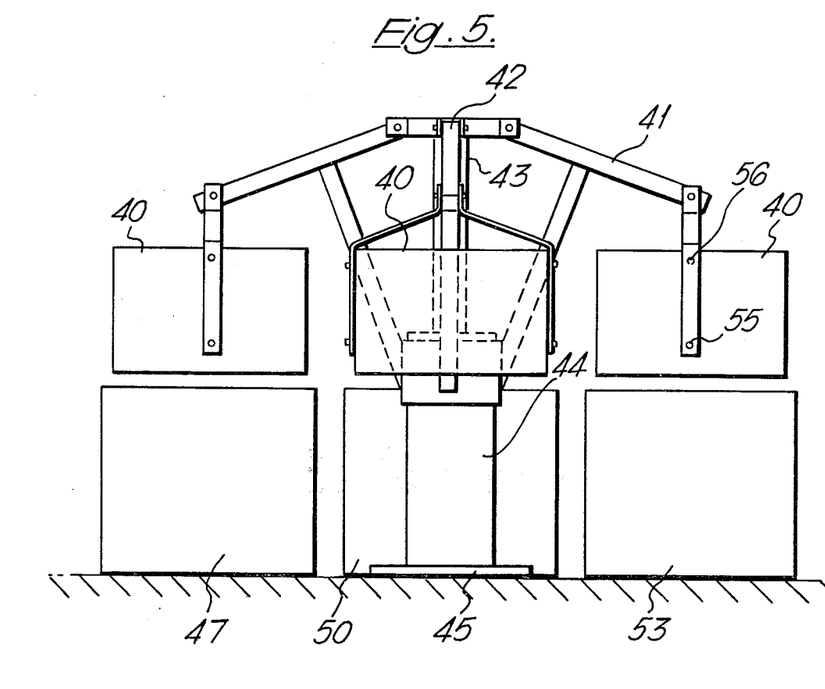

Referring now to FIGS. 4 and 5, these show an apparatus of the carousel type. Both for this apparatus, and for that subsequently to be described with reference to FIG. 6, the film needs to be shredded to between $\frac{1}{8}$" and 1/5" wide or to be chopped into pieces of approximately $\frac{3}{4}$" size. The chemicals used in both systems are exactly the same.

In the carousel apparatus, perforated film bins 40 are rotated stepwise in the horizontal plane suspended on the six arms 41 of a carousel having a top bearing 42 on a vertical ram rod 43. The whole carousel with the bins 40 is raised and lowered by a ram 44 standing on a floor plate 45. Film from the chopper or shredder is first fed into a bin 40 at station 46, with the ram 44 in the lowered position. Power is then supplied to the lifting ram and the arms 41 are raised into the upper postion (FIG. 5). The carousel is then rotated, so that the bin comes to station 47 which is the bleach tank and bleaching station. An air blower 48 continuously passes air into the solution in the bleaching tank 47. The ram is lowered and the bleaching treatment takes place.

After five minutes immersion in the bleach solution, power is applied to the ram and the carousel is raised and rotated to station 49, which is the first wash tank. This contains purely wash water which flows in and then out to drain taking away the contaminants.

After five minutes immersion, power is again applied to the ram, and the carousel is rotated to take the bin round to station 50. This is a wash and stop bath. The stop bath is to stop the pH of the fixer dropping too low and a chemical such as sodium sulphite, or any chemical of a similarly suitable alkaline nature, is added to this wash bath to maintain the pH at approximately 8. After a 10 minute draining cycle the ram is lowered and the film has a 5 minute wash in tank 50. Then again the carousel is lifted and rotated to station 51, which is the first fix bath.

Submersion in the fix bath 51 again lasts for 5 minutes. During this time the fixing solution is circulated by pumping from the bath 51 through a silver recovery unit 52 and back again to the bath 51 in a closed circuit. The silver recovery unit must be of sufficient size to remove all the silver which has entered the solution within the total cycle time; in this case 15 minutes. After the 5 minutes immersion the carousel is again lifted for 10 minutes drain time before being rotated to station 53.

Station 53 is the second fix tank which has a silver recovery unit 54 associated with it in the same way as tank 51, except that the required size of this silver recovery machine is only a quarter of the size of that required for tank 51. This is to ensure that any film which has not been fixed within its first 5 minutes in tank 51 is fixed out in tank 53. At the same time the level of silver in tank 53 can be maintained at a far lower level, that is about 0.5 grams/liter, to give minimal carry over.

After the submersion in tank 53 for 5 minutes the carousel is again lifted and it returns to station 46 where the bin is unloaded, which completes the full cycle. The bin is dropped for unloading by withdrawal of a locking pin 56 which allows the bin to swivel down about a swivel pin 55.

The ram cycle time is 15 minutes—being 5 minutes submersion in solutions and 10 minutes drain time. The load factor of the plant is four bins of film material processed per hour.

Figure 6:
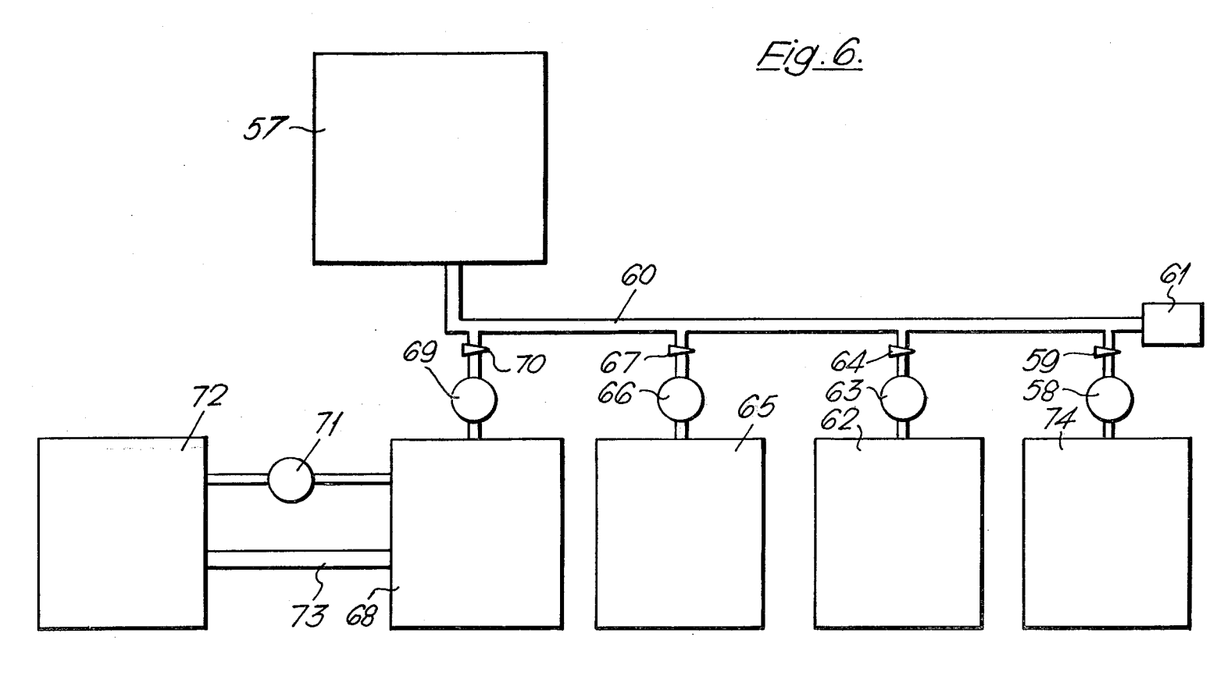
FIG. 6 is a diagrammatic elevation of a further form of apparatus for treating exposed film.

Referring now to FIG. 6, this shows a batch processing apparatus. The shredded or chopped film to be treated is placed in reaction vessel 57. The load could be $\frac{1}{2}$ a ton at a time. The tank 57 may be removable by a fork lift truck and tipped into a skip to empty or fill, or it may be on swivels so that it can be tilted and emptied into a conveyor or skip. The film material can be fed into this bin by a conveyor—either mechanical or air-blown. The processing cycle is as follows:

Tank 74 contains the bleaching agent. This is pumped up into the reaction vessel 57 by a pump 58 through a valve 59, which is opened at this time, and a manifold 60. At the same time air is blown by a blower 61 into the manifold to keep a constant circulation of solution within the reaction vessel 57.

At the end of 20 minutes from when reaction vessel 57 is filled with bleach solution, the air blower 61 is turned off, pump 58 is stopped and valve 59 is left open to allow the solution to drain back to tank 74 by gravity. The valve 59 is then closed.

The next operation is washing. Wash water is pumped up from tank 62 by pump 63 through valve 64, which is now opened, and the pipe manifold 60 to reaction vessel 57. At the same time the air blower 61 is used to agitate the contents of the vessel. The submersion time once the vessel is full is 10 minutes. At the end of 10 minutes the air blower is turned off, the pump 63 is stopped and the wash water drains back into tank 62. The valve 64 is then closed.

Similarly, pH adjusted wash water, with sodium sulphite or other suitable alkaline chemical to maintain a pH of approximately 8, is pumped from tank 65 into the reaction vessel, and allowed to drain back, by means of the pump 66 and valve 67.

A 10 minute submersion takes place with air agitation.

Finally, fixing solution is pumped from tank 68 by pump 69 through valve 70 to the reaction vessel. Air agitation is again employed and the submersion time is 15 minutes during which the pump is run continuously. The solution then drains back into tank 68. During this 15 minute cycle, a pump 71 is circulating the solution from the fix tank 68 through a silver recovery unit 72 via a pipe 73 and back to the tank 68, for removal of the silver.

The removal of silver must be at a speed sufficient to ensure that, at the end of the 15 minute cycle time, the silver in the solution in reaction vessel 57 is below ½ gram/liter to ensure minimal loss of silver.

In each of the apparatus of FIGS. 4 and 5 and FIG. 6, the second washing or stop bath is maintained at a pH of approximately 8 to prevent the pH of the fixing solution falling below a pH of 5, because when the pH of the fixing tank falls below 5 it has to be modified by the addition of sodium sulphite. In adding sodium sulphite to fixing tanks problems arise due to the risk of silver oxides being formed and precipitating out causing a loss of silver.

The apparatus of FIGS. 4 and 5 can carry loads of up to 50 kilos of shredded or chopped film per bin, the bins or baskets being 4' diameter and 18" deep. The apparatus of FIG. 6 can carrry 500 kilos of film per load, the size of the reaction veseel being 5' by 5' by 6' deep.

We claim:

1. A process for the recovery of silver from photographic film comprising the steps of:
   (a) shredding or chopping the film material into strips or pieces of predetermined size;
   (b) bleaching the shredded or chopped film material in a bath of bleach solution to convert the metallic silver present to silver salts that remain on the film material;
   (c) performing a first stage washing operation in which the bleached film material is washed with first stage wash water;
   (d) thereafter performing a second stage washing operation in which the bleached film material is washed with a second stage alkaline wash liquid separate and different from and more alkaline than the first stage wash water;
   (e) fixing the washed film material in at least one bath of fixing solution to remove the silver salts into the fixing solution;
   (f) collecting and transporting away the film base material from which the silver salts have been removed; and
   (g) circulating the fixing solution through at least one electrolytic silver recovery unit where the silver is electrolytically deposited on a cathode.

2. A process according to claim 1, wherein the film material is treated twice with fixing solutions, first in a main fixing bath and then in a tailings bath, and the main and tailings solutions are circulated separately through respective silver recovery units of which that for the tailings solution is of lower silver capacity and lower power.

3. A process according to claim 2 wherein the main fixing bath has a number of silver recovery units associated with it, and the tailings bath has a single silver recovery unit of lower capacity than each of the units associated with the main bath.

4. A process according to claims 1 or 2 wherein after each treatment step there is a period during which the film material is allowed to drain.

5. A process according to claim 1 or 2 wherein the recovered film base material is subjected to a further treatment, such as an enzyme treatment, for the removal of gelatine.

6. A process according to claim 1 or 2 employing a fixing solution of the composition:

| | |
|---|---|
| Ammonium thiosulphate | 140 g. |
| Sodium metabisulphate | 25 g. |
| Sodium sulphite | 25 g. |
| Water to | 1 liter. |

7. A process according to claim 1 or 2 employing a bleach solution of the composition:

| | |
|---|---|
| Copper sulphate crystals | 135 g. |
| Hydrochloric acid 37% | 25 ml. |
| Sodium chloride | 80 g. |
| Water to | 1 liter. |

8. Apparatus, including a bath of bleach solution, at least one bath of fixing solution, and at least one electrolytic silver recovery unit having a cathode, for performing a process for recovering silver from photographic film material by shredding or chopping the film material, bleaching the shredded or chopped film material in said bath of bleach solution to convert metallic silver present to silver salts that remain on the film material, washing the bleached film material with first stage wash water and thereafter washing the bleached film material with a second stage alkaline wash liquid separate and different from and more alkaline than the first stage wash water, fixing the washed film material in said at least one bath of fixing solution to remove silver salts, transporting the silver salts away from the film material and circulating the fixing solution through said at least one electrolytic silver recovery unit where silver is deposited on the cathode, said apparatus further comprising successive treatment towers through each of which the film material descends through a vertical succession of chambers by gravity, the descent being controlled by sliding plate valves located at intervals up the towers.

9. Apparatus according to claim 8, wherein there are three treatment towers for bleach, washing and fixing, respectively.

10. Apparatus according to claim 9, wherein the treatment liquids are introduced into the appropriate tower chambers by sprays.

11. Apparatus, including a bath of bleach solution, at least one bath of fixing solution, and at least one electrolytic silver recovery unit having a cathode, for performing a process for recoverng silver from photographic film material by shredding or chopping the film material in said bath of bleach solution to convert metallic silver present to silver salts that remain on the film material, washing the bleached film material with first stage wash water and thereafter washing the bleached film material with a second stage alkaline wash liquid separate and different from and more alkaline than the first stage wash water, fixing the washed film material in said at least one bath of fixing solution to remove silver salts, transporting the silver salts away from the film material, and circulating the fixing solution through said at least one electrolytic silver recovery unit where silver is deposited on the cathode, said apparatus further comprising a carousel for rotating bins of film material stepwise through a succession of treatment stations arranged in a ring with a ram for towering and raising the carousel to lower and lift the bins into and out of treatment tanks at the stations.

12. Apparatus according to claim 11, wherein at least one of the tanks has an associated air blower for agitation.

13. Apparatus according to claim 11 or claim 12, wherein the bins are carried on arms of the carousel on swivels so that when unlocked each bin can drop down about its swivel for unloading.

14. Apparatus, including a bath of bleach solution, at least one bath of fixing solution, and at least one electrolytic silver recovery unit having a cathode, for performing a process for recovering silver from photographic film material by shredding or chopping the film material, bleaching the shredded or chopped film material in said bath of bleach solution to convert metallic silver present to silver salts that remain on the film material, washing the bleached film material with first stage wash water and thereafter washing the bleached film material with a second stage alkaline wash liquid separate and different from and more alkaline than the first stage wash water, fixing the washed film in said at least one bath of fixing solution to remove silver salts, transporting the silver salts away from the film material, and circulating the fixing solution through said at least one electrolytic silver recovery unit where silver is deposited on the cathode, said apparatus further comprising a reaction vessel into which the film material to be treated is placed, and a series of solution tanks at a lower level than the reaction vessel and connected thereto by a pipe manifold with pumps and valves whereby each of the solutions in the solution tanks can in turn be pumped up to fill the reaction vessel and afterwards drained back into the respective solution tank.

15. Apparatus according to claim 14, further comprising an air blower for agitating the reaction vessel contents.

16. Apparatus according to claims 11 or 14 provided with two wash solutions tanks for carrying out two washing treatments between the bleaching and fixing stages, the first with only water and the second with water containing a chemical for raising its pH value.

* * * * *